United States Patent
Nussbaum et al.

[15] 3,643,939
[45] Feb. 22, 1972

[54] METHOD AND APPARATUS FOR TRANSPORTING STACKED FLAT ARTICLES SEQUENTIALLY TO A RECEIVER

[72] Inventors: Henry A. Nussbaum, Atlanta, Ga.; Henry W. Rehr, Concord; Clair W. Tellier, Jr., Yuba City, both of Calif.

[73] Assignee: Crown Zellerbach Corporation, San Francisco, Calif.

[22] Filed: June 22, 1970

[21] Appl. No.: 48,219

[52] U.S. Cl..................................271/62, 271/10, 271/68, 271/89
[51] Int. Cl.......................................................B65h 1/00
[58] Field of Search..................271/61, 62, 62 A, 68, 35, 89, 271/10, DIG. 7; 214/6 C, 1 R; 198/33 AD

[56] References Cited

UNITED STATES PATENTS

| | | | |
|---|---|---|---|
| 3,002,326 | 10/1961 | Carter | 214/6 C |
| 3,321,202 | 5/1967 | Martins | 271/68 |
| 3,262,697 | 6/1966 | Krunke | 271/35 |
| 3,080,070 | 4/1963 | Euwe | 214/6 C |
| 3,361,426 | 1/1968 | Pawlikowski | 271/89 |

FOREIGN PATENTS OR APPLICATIONS

| | | | |
|---|---|---|---|
| 736,769 | 9/1955 | Great Britain | 214/6 C |

*Primary Examiner*—Richard E. Aegerter
*Attorney*—John O. Reep and Corwin R. Horton

[57] ABSTRACT

An endless transfer conveyor has its article-supporting surface initially positioned in a substantially vertical article-receiving position and a pair of legs extend perpendicularly from the bottom end thereof. A stack of box blanks is moved by a stack conveyor to a position over the legs and against the article-supporting surface of the transfer conveyor. The transfer conveyor is then pivoted through an arc slightly greater than 90° to an article-discharging position and the blanks are deposited sequentially from the discharge end of the transfer conveyor onto a shingling conveyor. The shingling conveyor transfers the blanks sequentially onto a receiver. Scraper arm means are provided to accelerate removal of the last several blanks from the transfer conveyor to accumulate a supply of blanks on the infeed end of the shingling conveyor while the transfer conveyor returns to pick up another stack of blanks. Appropriate switch actuators are provided to energize drive motors as required.

21 Claims, 12 Drawing Figures

INVENTORS
HENRY A. NUSSBAUM
HENRY W. REHR
CLAIR W. TELLIER, JR.

BY John O. Reep
ATTORNEY

INVENTORS
HENRY A. NUSSBAUM
HENRY W. REHR
CLAIR W. TELLIER, JR.

BY John O. Reup
ATTORNEY

INVENTORS
HENRY A. NUSSBAUM
HENRY W. REHR
CLAIR W. TELLIER, JR.

BY John O. Reep
ATTORNEY

METHOD AND APPARATUS FOR TRANSPORTING STACKED FLAT ARTICLES SEQUENTIALLY TO A RECEIVER

BACKGROUND OF THE INVENTION

The present invention relates to a method of and apparatus for transporting stacked flat articles sequentially to a receiver for the articles. While reference is primarily made hereinafter to the method and apparatus as it applies to transporting a stack of box blanks sequentially from a stack thereof to a receiver, such as a hopper, it is to be understood that the invention also has application for transporting other articles.

It is conventional in certain types of paperboard blank-treating apparatus, such as a printer-slotter, to stack blanks in a hopper at the infeed end of the apparatus and then feed the blanks, one at a time, from the bottom of the stack into the apparatus for the desired operation to be performed thereon. To supply the hopper, it has been conventional in the past to transport a relatively high stack of blanks, which stack may be on the order of 5 feet high, and may include, for example, 330 blanks, to a location in the vicinity of the hopper and then use manpower to lift the blanks from the palletized stack and manually transport such blanks to the hopper. Considering the fact that such blanks may be quite bulky and cumbersome, it may require quite an expenditure of physical energy to feed the hopper at a fast enough rate to keep up with the pace of the machine which receives the blanks from the hopper.

Past attempts to provide means to mechanically feed the hopper in order to minimize manual lifting have not been too satisfactory considering the fact that during the operation it is desirable to minimize the risk of inadvertently spilling the stack and considering the fact that to optimize output of the apparatus, such as the printer-slotter, it is desirable to have the transporting mechanism that moves the blanks to the hopper operate in such a manner as to gain assurance that the hopper will have a continuous supply of blanks without undue risk of the blanks becoming jammed in the hopper.

SUMMARY

It is, therefore, an object of the present invention to provide a method and apparatus whereby stacked flat articles are transported sequentially to a receiver with minimized manual exertion and wherein the risk of inadvertently spilling the stack is minimized.

A further object is to provide an apparatus of nature indicated which operates in such a manner as to gain assurance that the receiver receiving the articles is continuously supplied with articles.

In accordance with one aspect of the present invention, a stack of flat articles is advanced, while the articles are maintained in a horizontal plane to minimize inadvertent spilling thereof, to a discharge end of a stack conveyor. An endless transfer conveyor is initially positioned at the discharge end of the stack conveyor with the article-supporting surface of the endless transfer conveyor extending substantially in a vertical plane to receive the aligned edges of the stack of articles. The articles and the transfer conveyor are then pivoted, while the articles are initially supported by legs extending perpendicularly from the bottom end of the transfer conveyor, to a position where the articles rest on their side edges on the transfer conveyor. The transfer conveyor sequentially discharges the articles individually or in small blocks onto a shingling conveyor, and the latter conveyor advances the articles in shingled disposition onto the receiver at the discharge end thereof.

In accordance with another aspect of this invention, means are provided to detect when the last blank to be discharged from the transfer conveyor is near the discharge end of the transfer conveyor. An accelerating device is responsive to such detection means to accelerate discharge of the last several blanks from the transfer conveyor so that a group of blanks are accumulated at the infeed end of the shingling conveyor which constitutes a supply while the transfer conveyor is pivoted to receive the next stack of blanks.

Other aspects reside in the use of switch actuators at appropriate locations to assure that energization and deenergization of appropriate drive means takes place at appropriate instances.

BRIEF DESCRIPTION OF THE DRAWING

An embodiment of the present invention is illustrated in the accompanying drawings in which.

GENERAL DESCRIPTION

In order to facilitate understanding of a detailed description of the various parts of the apparatus, it may be helpful to first provide a general operation description.

Figure 1:
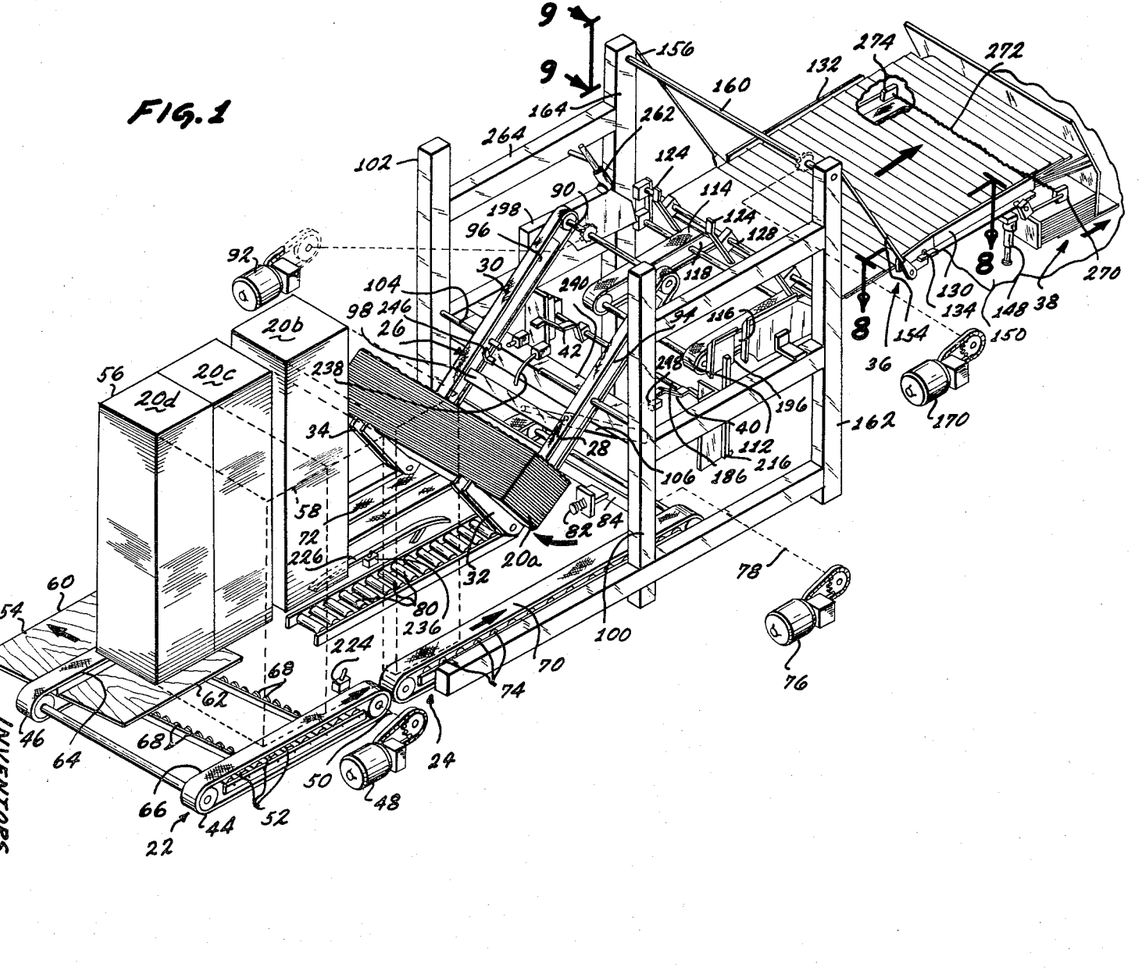
FIG. 1 is a perspective view of the apparatus of the present invention with certain parts broken away and other parts removed for clarity.

With reference to FIG. 1, a stack of box blanks 20a has been advanced by infeed conveyor 22 and stack conveyor 24 to a position adjacent the discharge end of the stack conveyor 24. Prior to the blanks arriving at this position, a transfer conveyor 26 has been positioned so that spaced belts 28 and 30 of an endless conveyor means forming a part of the transfer conveyor have their article-supporting surfaces disposed generally vertically to the horizontal plane of the blanks. In this vertical position of the endless transfer conveyor, a pair of legs 32 and 34 which extends substantially perpendicularly to the endless conveyor is beneath the bottommost blank in the stack (i.e., the lowermost dotted line position of FIG. 2A). The transfer conveyor is then pivoted through an arc slightly greater than 90° to the position indicated by the solid lines of FIG. 2A. The drive for the endless transfer conveyor means is then energized to sequentially discharge the blanks from the transfer conveyor onto an infeed end of a shingling conveyor 36. The shingling conveyor carries the blanks in the direction of the arrow (FIG. 1) and deposits the blanks from the discharge end of the shingling conveyor into a receiver or hopper 38.

When the blank nears the discharge end of the transfer conveyor (the position illustrated at FIG. 6), appropriate accelerating means in the form of scraper arms 40 and 42 is energized to accelerate removal of the last several blanks from the transfer conveyor onto the infeed end of the shingling conveyor (see FIG. 7) to constitute an excess supply for the shingling conveyor to be used up while the transfer conveyor is moved to receive another stack of blanks.

Infeed Conveyor

Infeed conveyor 22 comprises a pair of endless belts 44 and 46, each entrained about appropriate drive pulleys at opposite ends thereof. Motive power for the infeed conveyor is transmitted from an appropriate power source through a drive shaft 50 to a pulley at the discharge end of one of the belts, and the belts are driven at the same speed because a connecting shaft interconnects the opposite pulleys at the discharge end of each of the belts. Suitable support wheels 52 engage the under surface of the belts to aid in supporting the rather heavy stack of blanks.

It is conventional to initially support the stack of blanks on a flat pallet 54 and so it is necessary to remove the pallet before the blanks are fed into the subsequent transporting system. The distance between opposite sides edges 56 and 58 of the stack of blanks is greater than the distance between opposite side edges 60 and 62 of the pallet, and the distance between opposite side edges 56 and 58 of the stack of blanks is also greater than the distance between opposed inner side edges 64 and 66 of the conveyor belts 44 and 46. The distance between opposite side edges 60 and 62 of the pallet 54 is, however, less than the distance between the opposed inner edges 64 and 66 of the two conveyor belts 44 and 46. Therefore, the pallet will drop between the conveyor belts but the belts will continue to support the box blanks along their side edges. The pallet, after dropping between the belts, can be removed from a roller system 68 positioned beneath the infeed conveyor.

Stack Conveyor

The stack conveyor 24 also includes a pair of endless belts 70 and 72 supported at opposite ends thereof for rotation about appropriate pulleys. The under surface of each of the belts 70 and 72 is also supported along the length thereof by support wheels 74. A power source 76 is used to drive the belts at the same speed by virtue of its being connected to a drive shaft 78 extending between opposite pulleys at the discharge end of belts 70 and 72.

Figures 2A, 3:
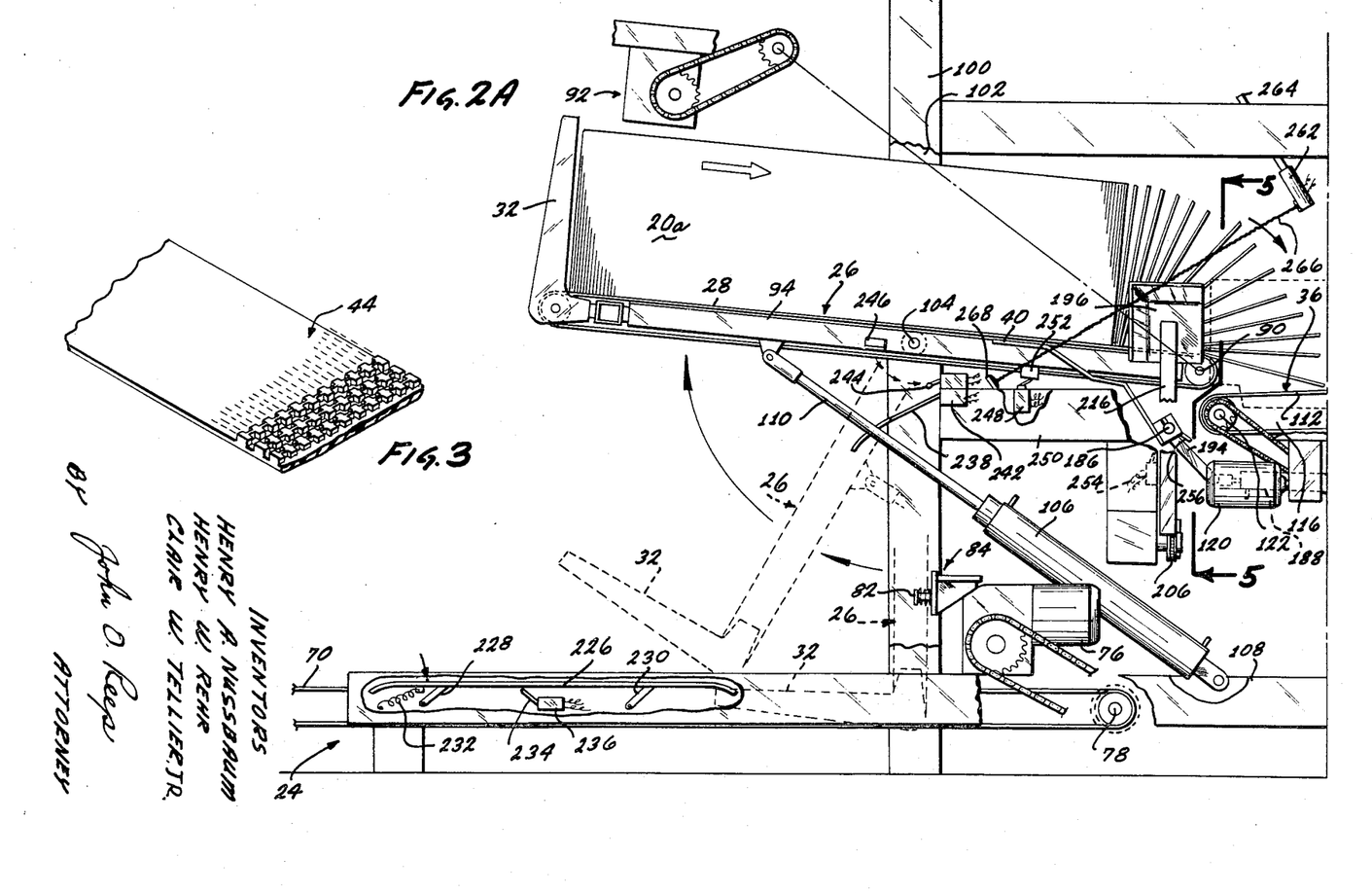
FIGS. 2A and 2B together represent a side elevational view of the apparatus of this invention.
FIG. 3 is an enlarged perspective view of a section of one of the belts used on the stack conveyor.

The belts may be formed of any material conventionally used for endless conveyors, and the article-supporting surfaces of the belts is desirably roughened as illustrated at FIG. 3 to obviate slipping of the belts relative to the box blanks.

Spring-loaded bumpers 82 are mounted on a frame member 84 near the discharge end of the stack conveyor and extending transversely of the direction of movement of the transfer conveyor 26 when approaching its lowermost position to air in cushioning the shock of the arrival of the conveyor at that position.

Transfer Conveyor

The transfer conveyor 26 includes a pair of endless conveyor means in the form of belts 28 and 30, which are supported for rotation about appropriate pulleys.

A drive shaft 90 interconnects the opposed pulleys at the discharge ends of the belts so that power from an appropriate power source 92 can be supplied to the drive shaft 90 to enforce simultaneous movement of the belts 28 and 30. Additional supporting structure for the belts 28 and 30 is in the form of plates 94 and 96 extending between the upper and lower runs of each of the belts and a horizontal cross-frame member 98 also provides additional support.

A pair of legs 32 and 34 is secured to respective plates 94 and 96 and the legs each extend in a directional substantially perpendicularly to the belts 28 and 30. The transfer conveyor 26 is pivotally connected to vertical frame members 100 and 102 of a supporting base through the medium of a transverse supporting rod 104, and axis of the rod 104 providing the axis of pivotal rotation. Pivotal movement of the transfer conveyor is accomplished through the medium of a piston-cylinder arrangement clearly disclosed at FIG. 2A. One end of the cylinder 106 is pivotally attached to a main horizontal supporting frame member 108 and the remote end of a piston rod 110 is pivotally secured to cross frame piece 98 which pivots with the conveyor and is connected at opposite ends to the plates 94 and 96.

The lowermost dotted line position of FIG. 2A is the position the transfer conveyor 26 occupies when it is adjacent the discharge end of the stack conveyor 24 to receive a stack of box blanks. The solid line position of the transfer conveyor, as illustrated at FIG. 2A, is the position the transfer conveyor occupies when it is discharging the blanks onto the shingling conveyor 36; and, in this position, it is preferred that the plane of the endless conveyor surfaces be inclined at an angle of 4° to 8° past the horizontal. When the transfer conveyor 26 is in a stack-receiving position the legs 32 and 34 extend in the space between the stack conveyor belts 70 and 72 and the idler rolls 80; and, in this position, the legs 32 and 34 are beneath the bottommost blank in the stack. As the transfer conveyor 26 is pivoted to its box blank-discharging position, the weight of the blanks becomes transferred to the article-supporting surfaces of the conveyor belts 28 and 30. The belts are, of course, spaced apart from each other an appropriate distance to permit the belts to support the stack of box blanks.

Shingling Conveyor

The shingling conveyor 36 also comprises a pair of endless belts 112 and 114 entrained for rotation about appropriate pulleys and spaced apart from each other an appropriate distance to support the shingled blanks in a manner most clearly illustrated at FIG. 1. Supporting plates 116 and 118 also extend between the upper and lower runs of each of the belts to provide additional support.

Figures 2B, 4:
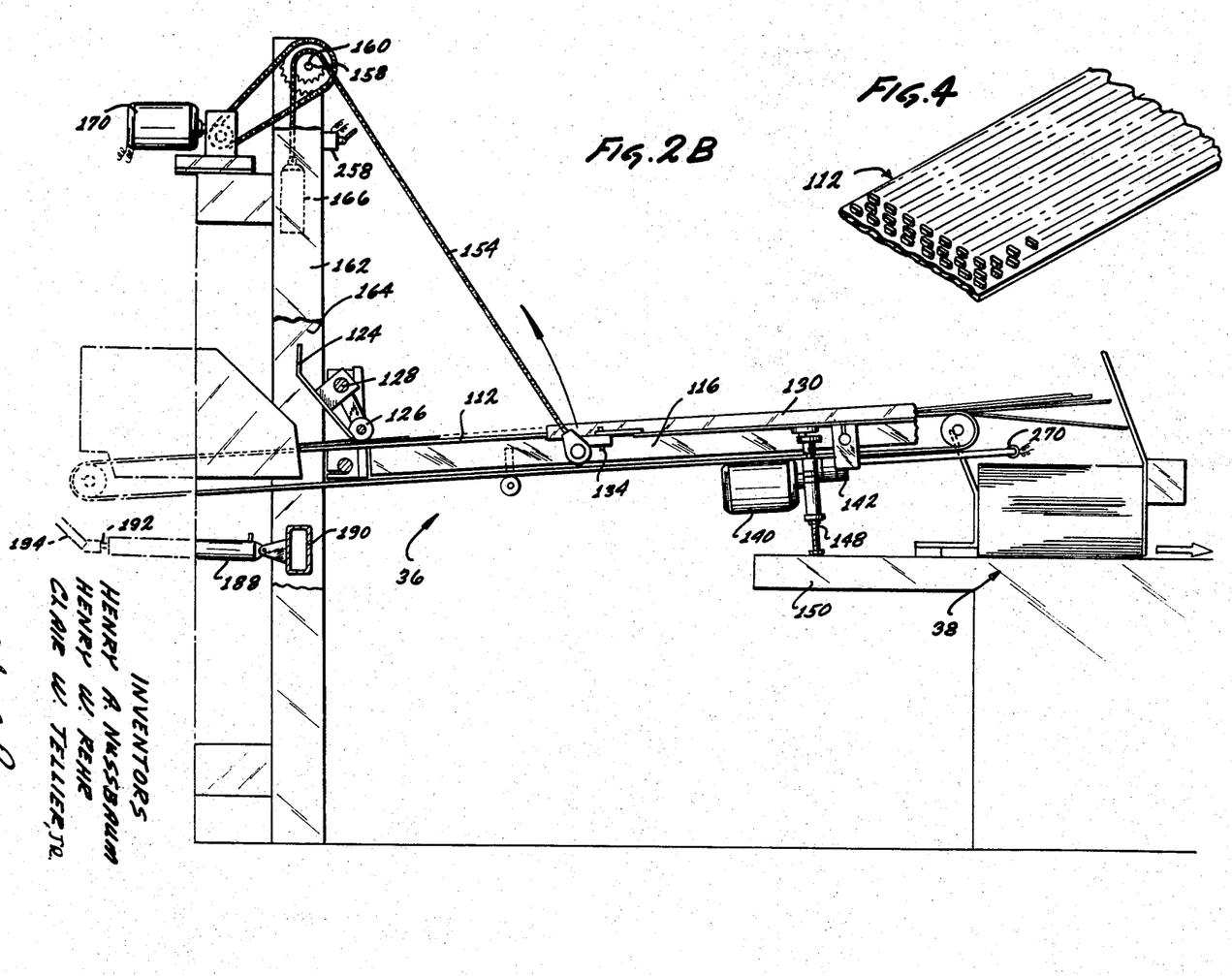
FIG. 4 is an enlarged perspective view of a section of one of the belts used on the shingling conveyor.

FIG. 4 is illustrative of a preferred roughened blank-transporting surface for the belts to obviate undue slippage of the belts relative to the box blanks carried by the belts.

Power source 120 (FIG. 2A) is connected to a common drive shaft 122 extending between the pulleys at the infeed end of the belt to drive the belts at the same speed.

When the transfer conveyor 26 is in the solid line position of FIG. 2A, the infeed end of the shingling conveyor 36 is located adjacent and immediately below the discharge end of the transfer conveyor so that as the box blanks are discharged from the transfer conveyor they fall onto the infeed end of the shingling conveyor.

The shingling conveyor advances the box blanks in the direction of the arrow of FIG. 1 and gate or spacer means are supported a predetermined distance above the shingling conveyor downstream of the infeed end for spacing the leading edges of the box blanks from each other and enforcing a shingled disposition on the box blanks. The spacer means is preferably in the form of a plurality of barlike elements 124 and rollers 126, each mounted on a transverse rod 128 in such a manner that the distance which the bars 124 and rollers 128 are located above the top surfaces of the shingling conveyor may be adjusted to change the spacing between the leading edges of the blanks.

Figure 8:
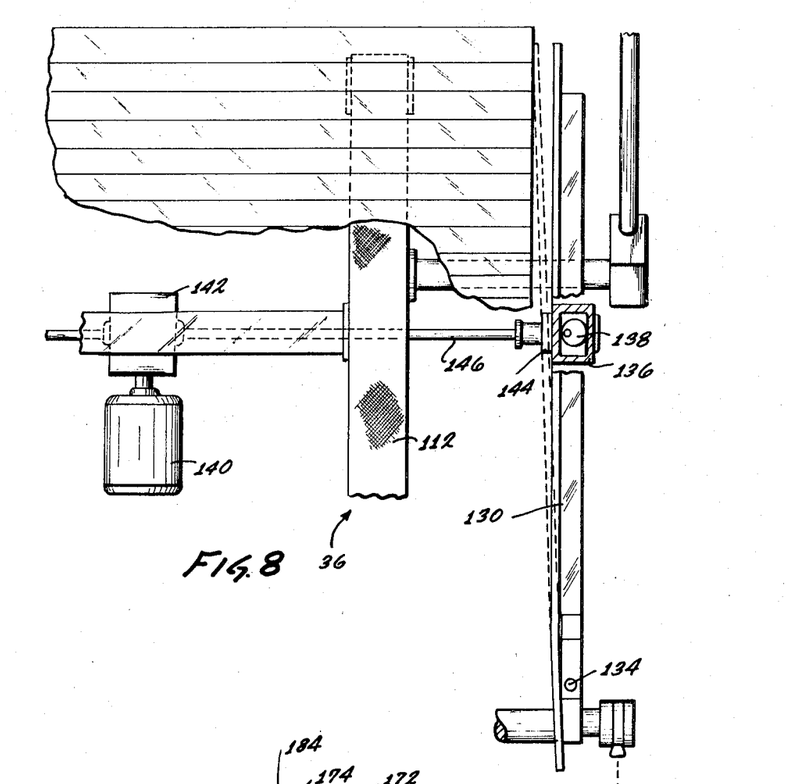
FIG. 8 is a broken away sectional view taken on line 8—8 of FIG. 1.
Figure 9:
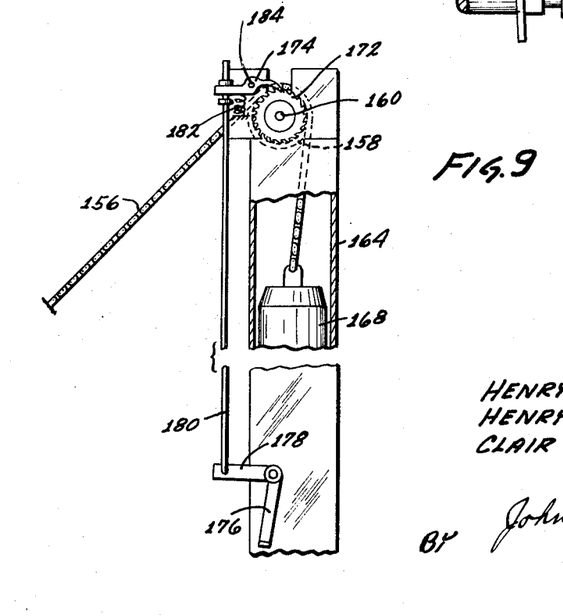
FIG. 9 is a broken away sectional view taken on line 9—9 of FIG. 1.

A pair of side rails 130 and 132 defines the sides of the path of travel of the shingled box blanks as they near the end of the shingling conveyor. To assure that the side edges of the blanks will be alignment with each other when the blanks are deposited from the shingling conveyor onto the receiver, it is desirable to provide a slight vibrating or jogging motion to the side edges of the blanks through the medium of the rails 130 and 132. To accomplish this (FIGS. 2B and 8), one end of each of the side rails is pivotally supported from appropriate framework throughout the medium of pivot pins 134. The other end of the side rails carries an element 136, the inner surface of which defines a cam follower surface which cooperates with a cam 138 to move the plate slightly outwardly and inwardly about pivot pin 134. Rotational motion for the cam is obtained from a motor 140 acting through appropriate gearboxes 142 and 144 (FIG. 8) and drive shaft 146.

The operative location of the shingling conveyor (FIGS. 1 and 2B) is determined by the adjustable location of a stop element 148 carried by the shingling conveyor when the stop element abuts a fixed frame member 150.

As illustrated, the receiver 38 is in the form of a hopper and box blanks may be removed one at a time from the bottom of the hopper by any known conventional pusher element into a device such as a printer-slotter, which performs additional operations on the blanks. It is to be understood, however, that this invention may also be readily applicable to areas wherein it is desired to feed blanks to other receivers for other purposes.

It is desirable to permit the discharge end of the shingling conveyor to be elevated to facilitate access to the receiver 38 for repair or any other purpose. To this end, the shingling conveyor is supported for pivotal rotation about the axis of a transverse support rod 122. One end of chains 154 and 156 are secured to supporting frame structure for the shingling conveyor, as illustrated at FIGS. 1 and 2B. Each chain passes about an associated sprocket 158 located on a shaft 160 which extends between vertical main support frame members 162 and 164, and counterweights 166 and 168 are attached to the other end of the chains. Shaft 160 which carries the sprockets 158 is rotated by drive motor 170 (FIG. 2B) to elevate the discharge end of the shingling conveyor, as desired.

Accelerating Means

When the transfer conveyor is energized to deposit blanks on the shingling conveyor, the blanks are deposited at a predetermined speed. As mentioned above, it is desirable to accelerate the speed of removal of the last several blanks from the transfer conveyor to accumulate an excess supply of box blanks on the infeed end of the shingling conveyor while the transfer conveyor is being returned to its blank-receiving station.

Figure 6:
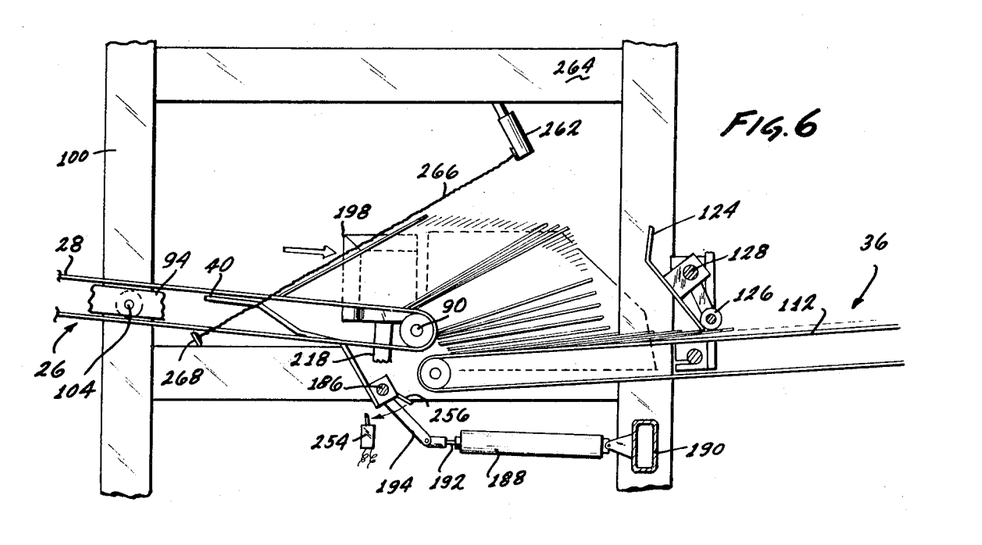
FIG. 6 is a side elevational view illustrating the scraper arm means in an inactive position.
Figure 7:
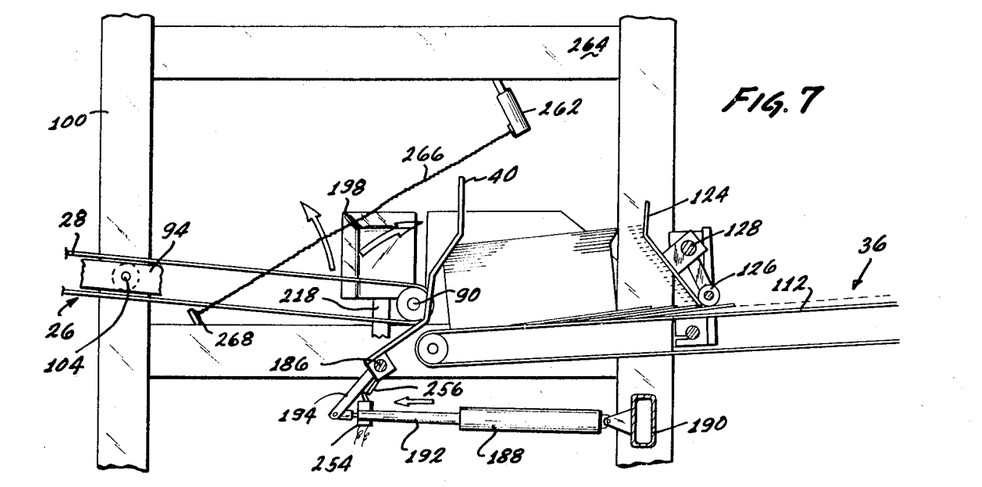
FIG. 7 is a view similar to FIG. 6 but illustrates the position of the scraper arm means after being activated.

One form of accelerating means which has been found to work well can best be understood by referring to FIG. 1, 6 and 7. In these latter figures, there is disclosed a pair of scraper arms 40 and 42 which are secured to a transverse shaft 186, and the ends of the shaft are rotatably journaled in appropriate frame members on opposite sides of the apparatus. The scraper arms are located adjacent the discharge end of the transfer conveyor. A piston-cylinder arrangement is provided wherein one end of the cylinder 188 is pivotally secured to a horizontal frame member 190. The remote end of piston rod 192 is pivotally connected to one end of a link 194 and the other end of the link is fixedly secured to the shaft 186. When the piston rod 192 is moved from the retracted position of FIG. 6 to the extended position of FIG. 7, the scraper arms 40 and 42 are rotated into contact with the last box blank and, because the speed of movement of the scraper arms is greater than the speed of the transfer conveyor, the movement of the blanks is accelerated to accumulate a group of blanks at the infeed end of the shingling conveyor, as illustrated at FIG. 7.

Appropriate detection means are utilized to detect when the last blank to be discharged from the transfer conveyor is near the discharge end thereof, but this detection means will be discussed in greater detail with discussion of the operation of the apparatus.

Jogger Plates

Figure 5:
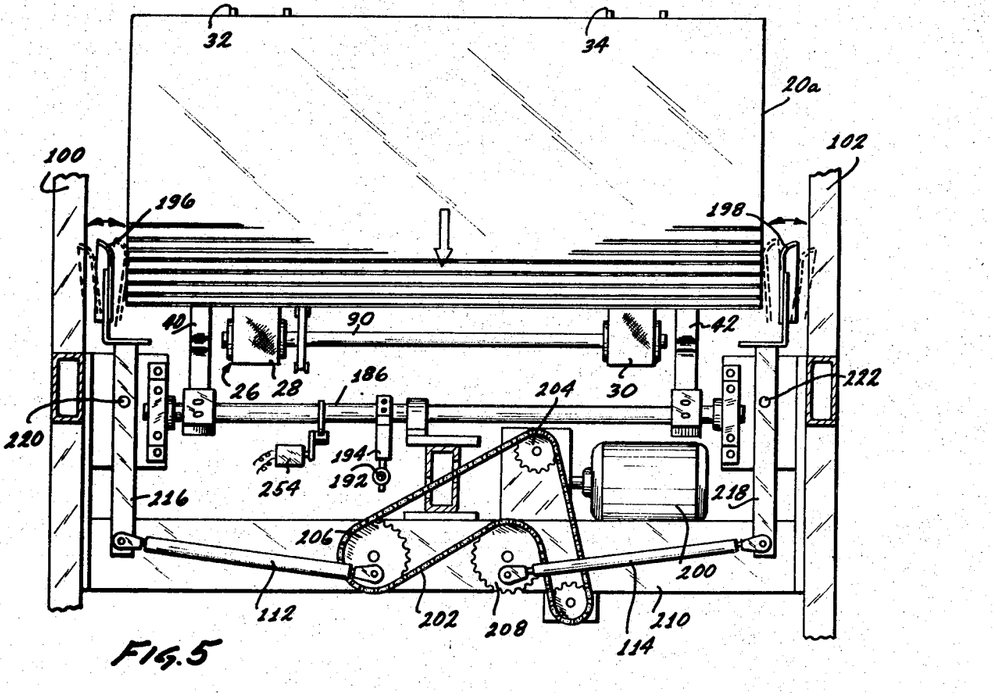
FIG. 5 is a sectional view taken along the line 5—5 of FIG. 2A.

It is possible during movement of the stack of blanks into the transfer conveyor, and during movement of the blanks from the infeed to the discharge end of the transfer conveyor, that the side edges of the box blanks may be slightly misaligned. Therefore, it is desirable to provide means which aids in alignment of the box blanks at a location near the discharge end of the transfer conveyor. To accomplish this, a pair of jogger plates 196 and 198 (FIG. 5) are positioned along opposite sides of the transfer conveyor near the discharge end thereof and the jogger plates are substantially in abutting relationship with the side edges of the box blanks. The jogger plates are movable toward and away from each other in a manner most clearly illustrated at FIG. 5. A motor 200 which drives the jogger plates enforces rotation on a drive chain 202. The drive chain is entrained about sprockets 204, 206 and 208 which are supported for rotation on a main horizontal frame member 210. Connecting rod 212 is pivotally connected to the face of sprocket 206 and connecting rod 214 is connected to the face of sprocket 208. The opposite ends of the connecting rods 212 and 214 are respectively pivotally connected to remote ends of extension arms 216 and 218. The jogger plates are fixedly secured at opposite ends of the extension arms. Movement of rods 212 and 214 is, therefore, operative to pivot the jogger plates 196 and 198 toward and away from each other about pivot points 220 and 222. Contact of the jogger plates with side edges of the blanks aids in assuring that the blanks remain in proper alignment.

Switch Actuators and Control Means

Suitable switch actuators and detection and control means are utilized to initiate proper sequential energization of the drive motors for the conveyors and of solenoid valves which control flow of pneumatic fluid to cylinders to provide actuation of the pistons for the pivotable conveyor and scraper arms.

A first switch actuator 224 is located near the discharge end of the infeed conveyor, and includes a pivotable roller arm normally spring biased to a position where it is in the path of travel of the lower most blank in the stack so that any time a stack of blanks is over this roller arm a switch will be actuated to perform a function more clearly illustrated in connection with a discussion of the operation which will be hereinafter related.

A second switch actuator 226 is in the form of an elongated flat bar which is suitably supported between the idler rolls 80 and one of the conveyor belts 72 of the stack conveyor (FIGS. 1 and 2). The bar 226 is supported from suitable framework through the medium of pivot links 228 and 230, and is normally urged to an upper position by a spring 232 where it will be in a path to be engaged by the lowermost blank in the stack of box blanks. When any portion of the bar is, in fact, engaged by the lowermost box blank in the stack, the bar is moved downwardly against the bias of spring 232 into actuating contact with an arm 234 connected to switching means 236 positioned immediately below the bar.

A third switch actuator is in the form of a thin metal rod 238 which is suitably mounted on horizontal main frame member 240 and projects through the opening between conveyor belts 28 and 30 (FIGS. 1 and 2A) when the endless transfer conveyor is in its vertical stack-receiving position. The arm is contacted by the leading edge of the stack of blanks to actuate suitable switching means 242 associated with the arm.

A fourth actuator 244 is also mounted on frame member 240, and movement of the actuating arm for this actuator is controlled by an abutment element 246 carried by a supporting plate 96 in the transfer conveyor.

A fifth actuator 248 is mounted on horizontal frame member 250, and movement of the control lever for this actuator is controlled by an abutment element 252 carried by the transfer conveyor support structure. The control lever of this actuator is contacted by abutment element 252 when the transfer conveyor 26 is in its blank-discharging position.

A sixth actuator 254 (FIGS. 6 and 7) is mounted on a suitable supporting frame with its control arm in the path of travel of an abutment element 256 secured to shaft 186 upon which the scraper arms 40 and 42 are mounted.

A seventh actuator 258 (FIG. 2B) is mounted on vertical frame member 164 and has its control arm located in the path of pivotal travel of the shingling conveyor when the shingling conveyor is pivoted upwardly by energization of motor 170. The function of this actuator is to deenergize motor 170 when the shingling conveyor is in its extreme elevated position.

In addition to the switch actuators just mentioned it is desirable to provide two photoelectric detectors which provide certain detection and control functions.

A first photoelectric cell 262 (FIGS. 6 and 7) has its light source mounted on frame member 264 above the blanks on the transfer conveyor 26, when the conveyor is in its blank-discharging position, and the cell directs its light ray 266 at an angle toward a light receiver 268 located beneath the blanks. After the light ray 266 has been interrupted by the conveyor 26 arriving at its blank-discharging position, the light receiver will not see light until the last blank is near the discharge end of the conveyor.

A second photoelectric cell 270 is carried by the shingling conveyor 36 at the discharge end thereof, and this cell directs its light ray 272 horizontally across the hopper 38 toward a light receiver 274 at a predetermined level above the bottom of the hopper when the shingling conveyor is in position to discharge blanks into the hopper. When the level of blanks in the hopper reaches a certain predetermined level, the light ray 272 will be interrupted to deenergize the transfer conveyor 26 and the shingling conveyor 36 until the level in the hopper 38 has again receded to the proper level.

Figure 10:
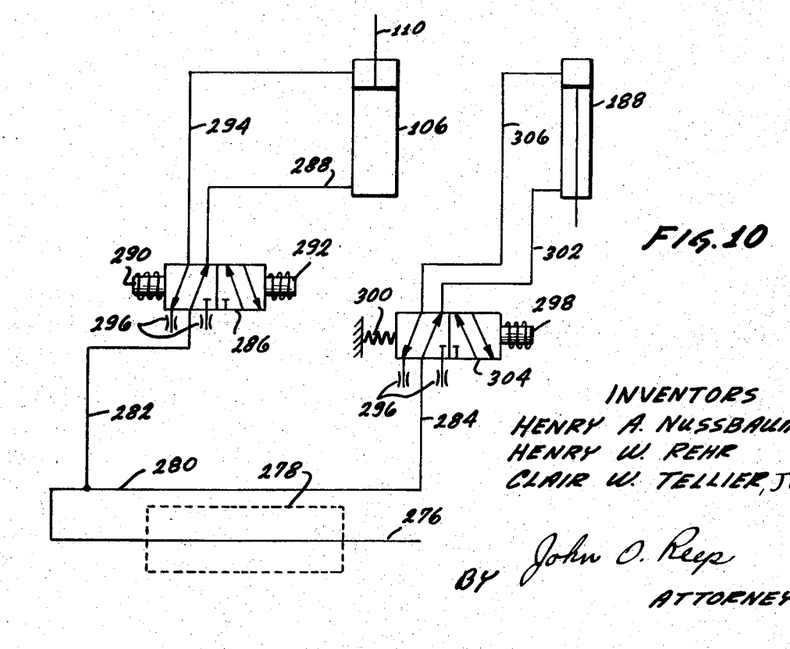
FIG. 10 is a diagrammatic view of part of the pneumatic system and associated solenoid actuators; and, FIG. 11 is a diagrammatic functional diagram to illustrate relationship of various switching and controlling functions.

FIG. 10 illustrates control for the pneumatic system which operates the pistons which pivot the transfer conveyor 26 and the scraper arms 40 and 42. A main fluid supply line 276 passes through appropriate filter and regulator means 278 to a manifold line 280 which supplies feed lines 282 and 284. Feed line 282 supplies solenoid valve 286 which controls flow to cylinder 106 to actuate piston rod 110 that tilts the transfer conveyor; and, in the position illustrated in FIG. 10, fluid has moved upwardly in line 288 by virtue of energization of solenoid 290 to move the transfer conveyor 26 to the discharging position of FIG. 2A. When solenoid 292 is energized (and solenoid 290 is deenergized) fluid will pass upwardly through line 294 to return the conveyor 26 to its vertical position. Valves 296 are used to adjust flow control.

Still referring to FIG. 10, cylinder 188 houses the piston associated with piston rod 192 that moves the scraper arms 40 and 42. In the position illustrated, solenoid 298 is deenergized and the solenoid valve 304 is under the control of spring 300 so that fluid flows upwardly in line 302 and the scraper arms are in their "down" position of FIG. 6. When solenoid 298 is energized the valve 304 moves to the left against the bias of spring 300 to permit fluid to flow upwardly through line 306 which moves the scraper arms 40 and 42 to the "up" position of FIG. 7.

Operation

In order to provide flexibility, it is desirable that the several motors which drive the several conveyors be capable of operation at different speeds. When, however, the blanks are fed from the bottom of hopper 38 at a rate of 300 blanks per minute, it is desirable to drive shingling conveyor 36 at about 75 feet per minute, transfer conveyor 26 at about 5 feet per minute, infeed conveyor 22 at about 70 feet per minute, and stack conveyor 24 at about 70 feet per minute.

Figure 11:
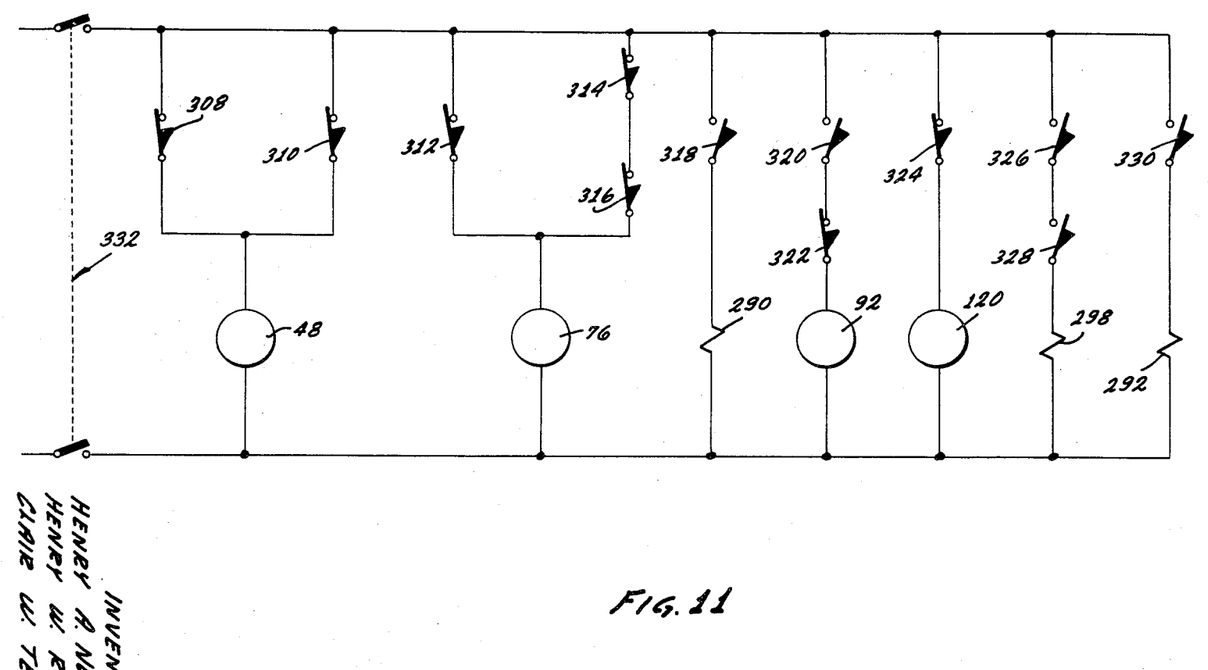

FIG. 11 functionally illustrates the "normal" positions of several control switches, "normal" being the switch position when no blanks have yet been received on the infeed conveyor, the transfer conveyor is in vertical position, the scraper arms are retracted to the position of FIG. 6, and the shingling conveyor is in position to discharge blanks into the hopper.

Before detailing the operational sequence, it may be desirable to relate the switches to the actuators therefor.

Switch 308 is actuated by the first switch actuator 224. This switch is normally closed, but is opened by a stack of blanks contacting actuator 224 at the discharge end of the infeed conveyor 22.

Switch 310 is controlled by the second actuator 226. This switch is normally closed, but is open any time a stack of blanks is in contact with the second actuator. Switch 312 is also controlled by the second actuator 226.

Switch 314 is controlled by the third switch actuator 238. This switch is normally closed, but is opened when a stack of blanks contacts actuator 238 when the stack arrives near the discharge end of the stack conveyor 24, and the stack is received against the vertically positioned endless transfer conveyor. The bar forming the second actuator 226 is so positioned relative to the length of the blanks that when a stack of blanks is in position against the third switch actuator 238, this stack continues to contact the second switch actuator. Contact with actuator 226 is terminated when the transfer conveyor begins pivotal movement and lifts the load from the bar actuator.

Switch 316 is controlled by the fourth actuator 244. This switch is normally closed when the transfer conveyor is in vertical position, but the switch is opened when the transfer conveyor begins pivotal movement to its article-discharging position.

Switch 318 is also controlled by the third switch actuator 238, but this switch is normally open and closes when a stack of blanks arrives at a position to actuate the rod 238. When switch 318 closes, current is supplied to solenoid 290 which moves solenoid valve 286 to the position illustrated at FIG. 10, and in this position the piston rod 110 is moved to tilt the conveyor to its blank-discharging position.

Switch 320 is controlled by the fifth actuator 248. This switch is normally open, but closes when the transfer conveyor arrives at its article-discharging position.

Switches 322 and 324 are controlled by the photoelectric cell 270. Each of these switches is normally closed, but each opens when the light ray 272 is interrupted by the stack of blanks in the hopper exceeding a predetermined level.

Switch 326 is controlled by the photoelectric cell 262. This switch is normally open, but is closed when the light ray 266 is seen by light receiver 268.

Switch 328 is also controlled by the fifth actuator 248. This switch is normally open, but closes when the transfer conveyor moves to its article-discharging position. When switches 326 and 328 are closed, solenoid 298 is energized to move solenoid valve 304 against the bias of spring 300 to a position permitting pressurized pneumatic fluid to flow upwardly (FIG. 10) through line 306 and actuate piston rod 192 to move scraper arms 40 and 42 from the position of FIG. 6 to the position of FIG. 7.

Switch 330 is controlled by the sixth actuator 254. This switch is normally open, but is closed by the scraper arms 40 and 42 arriving at their position of FIG. 7 to actuate solenoid 292 which drives the piston rod 110 to move the transfer conveyor to its vertical blank-receiving position.

Now, giving consideration to a complete cycle of operation, main control switch 332 is closed which energizes motors 48, 76 and 120, which drive, respectively, the infeed conveyor, the stack conveyor and the shingling conveyor. It is to be understood that a continuous sequence of stacks of blanks (i.e., stacks 20a, 20b, 20c and 20d) are supplied to the infeed conveyor 22, one after the other from any appropriate source.

Stack 20a first contacts actuator 224 to open switch 308, and then stack 20a moves onto stack conveyor 24 and contacts actuator 226 to open switches 310 and 310. By this time, another stack 20b of blanks has contacted actuator 224 so infeed conveyor stops while the stack conveyor moves stack 20a into a position contiguous to the vertically positioned endless conveyor belts of the transfer conveyor 26.

Contact of the stack of blanks with actuator 238 closes switch 318 to energize solenoid 290 which permits pneumatic fluid to flow through line 288 into cylinder 106 to actuate the piston rod 110 which tilts the transfer conveyor 26 to its box blank-discharging position. As soon as the transfer conveyor leaves the vertical blank-receiving position, switch 316 is opened as a result of element 246 moving away from the fourth actuator 244. Bar actuator 226 is also released to cause switches 310 and 312 to reclose so that a second stack 20b is moved to a ready position at the infeed end of the stack conveyor 24, at which time both the infeed conveyor 22 (motor 48) and the stack conveyor 24 (motor 76) are deenergized.

When the transfer conveyor arrives at the blank-discharging position (FIG. 2A), the fifth actuator 248 closes switch 320 to energize motor 92 which drives the transfer conveyor belts 28 and 30. Blanks are continuously discharged onto the shingling conveyor 36, and when the last blank nears the discharge end of the transfer conveyor (for example, there may be about 70 blanks still on the conveyor) photoelectric cell 262 has its ray 266 no longer interrupted by the blanks so that switch 326 is closed. Remembering that switch 328 has been closed by arrival of the conveyor 26 at the article-discharging position, a circuit can now be traced through solenoid 298 which moves valve 304 (FIG. 10) to a position where pressurized air can flow to cylinder 188 to actuate the scraper arms to the position of FIG. 7 and accelerate removal of the last several blanks from the end of the transfer conveyor.

Arrival of the scraper arms at the position of FIG. 7 actuates switch actuator 254 which closes switch 330 and energizes solenoid 292. Energization of solenoid 292 moves solenoid valve 286 to a position where pneumatic fluid enters cylinder 106 through line 294 to return the piston and the transfer conveyor to its original blank stack-receiving position.

As soon as the transfer conveyor moves away from the blank-discharging position, switch 328 is opened to deenergize solenoid 298 and cause the solenoid valve to return under bias of spring 300 to a position where the scraper arms are returned to the position of FIG. 6.

As soon as the transfer conveyor reaches it blank stack-receiving position another cycle is initiated.

One feature which minimizes the risk of inadvertently spilling the blanks is that the stack is not tilted from a substantially horizontal position of the blanks until the stack is supported both from the bottom by legs 32 and 34 and along the edges by endless conveyor belts 28 and 30.

Features that aid in gaining assurance that the receiver is continuously supplied with articles include the provision of accelerating removal of the last several blanks from the transfer conveyor to build up an excess supply on the infeed end of the shingling conveyor while the transfer conveyor returns for another stack of articles. Furthermore, it is felt that feeding and shingling the blanks on near horizontal planes contribute to reliability and tend to reduce jamming in the hopper that may otherwise occur if the blanks are fed and shingled on substantially inclined conveyors.

While the foregoing specification has set forth an embodiment of the invention in detail for purpose of making a complete disclosure, various other embodiments and modifications will occur to those skilled in the art, but will fall within the spirit and scope of the invention defined in the following claims.

What is claimed is:

1. Apparatus for transporting stacked, flat articles, such as box blanks, to receiver which receives the articles sequentially, said apparatus comprising:
   a. stack conveyor means for receiving each stack of articles and for feeding the articles to a discharge end thereof;
   b. a pivotable transfer conveyor including:
      i. support structure pivotally connected to a base;
      ii. endless transfer conveyor means mounted on said support structure for pivotal movement therewith from a first substantially vertical position at the discharge end of said stack conveyor, where said endless conveyor means receives the leading edge of the vertical stack of articles in abutting relation thereto, to a second position where the weight of the articles is supported on the endless conveyor for movement of the articles therewith to the discharge end of the endless transfer conveyor;
      iii. legs connected to said support structure for pivotal movement therewith and extending substantially perpendicular to the endless conveyor means from one end thereof, said legs being located beneath the bottom surface of the lowermost article in the stack when said transfer conveyor is in said first position; and
      iv. means for driving said endless conveyor means to discharge articles therefrom at a predetermined speed;
   c. means for pivoting said transfer conveyor between said first and second positions thereof;
   d. an endless shingling conveyor supported from a frame at a location where an infeed end thereof is adjacent the discharge end of the transfer conveyor when the transfer conveyor is in said second position for receiving articles sequentially discharged from the transfer conveyor, and said shingling conveyor having a discharge end from where articles are deposited sequentially on the receiver, and means for driving the shingling conveyor in a direction from said infeed end toward said discharge end thereof; and
   e. switch means responsive to the arrival of said endless transfer conveyor means at said second position for energizing said endless transfer conveyor.

2. The apparatus as set forth in claim 1 wherein said endless shingling conveyor is pivotally mounted on said frame, and said apparatus further includes means for pivoting the discharge end of said shingling conveyor to an elevated position to facilitate access to the article receiver.

3. The apparatus as set forth in claim 1 which further includes a spacer means supported a predetermined distance above the shingling conveyor for spacing the leading edges of the articles from each other on the shingling conveyor as the articles are advanced with the shingling conveyor.

4. The apparatus as set forth in claim 1 which includes a switch actuator positioned to be actuated by arrival of said stack of articles at the discharge end of said stack conveyor when the lowermost article is above said legs, and means responsive to the actuation of said actuator for pivoting said transfer conveyor from said first position to said second position thereof.

5. The apparatus as set forth in claim 1 wherein each stack of blanks is initially supported on a pallet which is narrower than the width of the blanks, and said apparatus further includes an infeed conveyor for feeding stacks to the stack conveyor, said infeed conveyor including belts spaced apart from each other a distance greater than the width of the pallet but less than the width of the blanks for said pallet to drop between the infeed conveyor belts.

6. Apparatus for transporting stacked, flat articles, such as box blanks, to a receiver which receives the articles sequentially, said apparatus comprising:
   a. means for pivoting the stack of articles from a first position where the stack rests on the lowermost article to a second position where the articles rest on aligned side edges thereof;
   b. a transfer conveyor for receiving the articles on their side edge in said second position and having a discharge end; and means for moving said transfer conveyor and said blanks at a first predetermined speed;
   c. a shingling conveyor having an end located adjacent the discharge end of said transfer conveyor for advancing the articles sequentially to the receiver at the discharge end of the shingling conveyor; and,
   d. means for accelerating the travel of the last article on the transfer conveyor when the last article nears the end thereof to accumulate a supply of blanks on the infeed end of the shingling conveyor while said transfer conveyor receives another stack of articles.

7. The apparatus as set forth in claim 6 wherein said accelerating means comprises scraper arm means mounted adjacent the transfer conveyor near the discharge end thereof, and means for moving the scraper arm means at a speed greater than said first predetermined speed through a path of travel from a first position beneath the transfer conveyor to a second position when the last blank has been contacted and accelerated by the scraper arm means.

8. A method of transporting stacked, flat articles, such as box blanks which are initially stacked on top of each other, to a receiver which receives the articles in sequence, said method including the steps of:
   a. advancing a stack of articles from an infeed to a discharge end of an article stack conveyor;
   b. initially positioning an endless transfer conveyor with a movable article-supporting surface thereon substantially in a vertical plane and located at a position adjacent the discharge end of the article stack conveyor for receiving the stack of articles;
   c. pivoting said endless transfer conveyor and said stack of articles to a second position where the side edges of the articles rest on the article-supporting surface of the endless transfer conveyor, and actuating a switch actuator in response to arrival of said transfer conveyor at said second position to energize said transfer conveyor;
   d. moving the endless transfer conveyor at a predetermined speed when said transfer conveyor is at said second position to discharge articles sequentially from a discharge end thereof; and,
   e. receiving the articles sequentially from the discharge end of the transfer conveyor onto a shingling conveyor and moving the articles from a discharge end of the shingling conveyor onto the receiver.

9. In an apparatus for transporting stacked flat articles, such as box blanks, to a receiver wherein said apparatus includes a transfer conveyor intermediate a stack infeed conveyor and the receiver, said transfer conveyor including:
 a. support structure pivotally connected to a base about a pivotal axis therefor;
 b. endless transfer conveyor means mounted on said support structure for pivotal movement therewith from a first substantially vertical position where said endless conveyor means is located to receive the leading edge of the vertical stack of articles in abutting relation thereto to a second position where the weight of the articles is supported on the endless conveyor for movement of the articles thereon to the discharge end of the transfer conveyor;
 c. legs connected to said support structure for pivotal movement therewith and extending substantially perpendicular to the endless conveyor means from one end thereof, said legs being in a position to receive the stack of articles above the legs when said transfer conveyor is in said first position;
 d. means for driving said endless conveyor means to discharge articles therefrom at a predetermined speed;
 e. means for pivoting the transfer conveyor about said pivotal axis between said first and second positions; and
 f. switch means responsive to the arrival of said endless transfer conveyor means at said second position for energizing said endless transfer conveyor.

10. The apparatus as set forth in claim 9 wherein said pivotal axis for the endless transfer conveyor is located intermediate said legs and the discharge end of the conveyor.

11. The apparatus as set forth in claim 9 which further includes a pair of spaced jogger plates positioned along opposite sides of said transfer conveyor when said transfer conveyor is in said second position, and means for moving the jogger plates toward and away from each other to contact misaligned articles and aid in alignment thereof.

12. Apparatus for transporting stacked, flat articles, such as box blanks, to receiver which receives the articles sequentially, said apparatus comprising:
 a. stack conveyor means for receiving each stack of articles and for feeding the articles to a discharge end thereof;
 b. a pivotable transfer conveyor including:
  i. support structure pivotally connected to a base;
  ii. endless transfer conveyor means mounted on said support structure for pivotal movement therewith from a first position at the discharge end of said stack conveyor, where said endless conveyor means receives the vertical stack of articles, to a second position where the weight of the articles is supported on the endless conveyor for movement of the articles therewith to the discharge end of the endless transfer conveyor;
  iii. legs connected to said support structure for pivotal movement therewith and extending substantially perpendicular to the endless conveyor means from one end thereof, said legs being located beneath the bottom surface of the lowermost article in the stack when said transfer conveyor is in said first position; and
  iv. means for driving said endless conveyor means to discharge articles therefrom at a predetermined speed;
 c. means for pivoting said transfer conveyor between said first and second positions thereof; and,
 d. an endless shingling conveyor supported from a frame at a location where an infeed end thereof is adjacent the discharge end of the transfer conveyor when the transfer conveyor is in said second position for receiving articles sequentially discharged from the transfer conveyor, and said shingling conveyor having a discharge end from where articles are deposited sequentially on the receiver, and means for driving the shingling conveyor in a direction from said infeed end toward said discharge end thereof; and
 e. means for detecting when the last blank to be discharged from the transfer conveyor is near the discharge end thereof, and accelerating means responsive to said detection means for accelerating removal of the last blank from the transfer conveyor onto the shingling conveyor.

13. The apparatus as set forth in claim 12 wherein said accelerating means comprises scraper arm means movably mounted adjacent the transfer conveyor near the discharge end thereof, and means for moving the scraper arm means at a speed greater than the speed of movement of the transfer conveyor through a path of travel from a first position beneath the transfer conveyor to a second position where the end blank has been contacted by the scraper arm means and accelerated onto the shingling conveyor.

14. The apparatus as set forth in claim 13 which further includes a switch actuator which is positioned to be actuated by arrival of said scraper means at said second position for actuating a switch, and means responsive to such switch actuation to move said transfer conveyor means from said second position of said transfer conveyor to said first position of said transfer conveyor.

15. Apparatus for transporting stacked, flat articles, such as box blanks, to receiver which receives the articles sequentially, said apparatus comprising:
 a. stack conveyor means for receiving each stack of articles and for feeding the articles to a discharge end thereof;
 b. a pivotable transfer conveyor including:
  i. support structure pivotally connected to a base;
  ii. endless transfer conveyor means mounted on said support structure for pivotal movement therewith from a first position at the discharge end of said stack conveyor, where said endless conveyor means receives the vertical stack of articles, to a second position where the weight of the articles is supported on the endless conveyor for movement of the articles therewith to the discharge end of the endless transfer conveyor;
  iii. legs connected to said support structure for pivotal movement therewith and extending substantially perpendicular to the endless conveyor means from one end thereof, said legs being located beneath the bottom surface of the lowermost article in the stack when said transfer conveyor is in said first position; and
  iv. means for driving said endless conveyor means to discharge articles therefrom at a predetermined speed;
 c. means for pivoting said transfer conveyor between said first and second positions thereof;
 d. an endless shingling conveyor supported from a frame at a location where an infeed end thereof is adjacent the discharge end of the transfer conveyor when the transfer conveyor is in said second position for receiving articles sequentially discharged from the transfer conveyor, and said shingling conveyor having a discharge end from where articles are deposited sequentially on the receiver, and means for driving the shingling conveyor in a direction from said infeed end toward said discharge end thereof; and
 e. a pair of spaced jogger plates positioned along opposite sides of said transfer conveyor when said transfer conveyor is in said second position, and means for moving the jogger plates toward and away from each other to contact misaligned articles and aid in alignment thereof.

16. Apparatus for transporting stacked, flat articles, such as box blanks, to receiver which receives the articles sequentially, said apparatus comprising:
 a. stack conveyor means for receiving each stack of articles and for feeding the articles to a discharge end thereof;
 b. a pivotable transfer conveyor including:
  i. support structure pivotally connected to a base;
  ii. endless transfer conveyor means mounted on said support structure for pivotal movement therewith from a first position at the discharge end of said stack conveyor, where said endless conveyor means receives the vertical stack of articles, to a second position where the weight of the articles is supported on the endless conveyor for movement of the articles therewith to the discharge end of the endless transfer conveyor;

iii. legs connected to said support structure for pivotal movement therewith and extending substantially perpendicular to the endless conveyor means from one end thereof, said legs being located beneath the bottom surface of the lowermost article in the stack when said transfer conveyor is in said first position; and iv. means for driving said endless conveyor means to discharge articles therefrom at a predetermined speed;

c. means for pivoting said transfer conveyor between said first and second positions thereof;

d. an endless shingling conveyor supported from a frame at a location where an infeed end thereof is adjacent the discharge end of the transfer conveyor when the transfer conveyor is in said second position for receiving articles sequentially discharged from the transfer conveyor, and said shingling conveyor having a discharge end from where articles are deposited sequentially on the receiver, and means for driving the shingling conveyor in a direction from said infeed end toward said discharge end thereof; and e. a switch actuator positioned to be actuated by arrival of said stack of articles at the discharge end of said stack conveyor when the lowermost articles is above said legs, and means responsive to the actuation of said actuator for pivoting said transfer conveyor from said first position to said second position thereof; and another switch actuator positioned to be actuated by arrival of said transfer conveyor at said second position, and means responsive to the actuating of said other actuator for energizing the drive means for said endless transfer conveyor means.

17. Apparatus for transporting stacked, flat articles, such as box blanks, to receiver which receives the articles sequentially, said apparatus comprising:

a. stack conveyor means for receiving each stack of articles and for feeding the articles to a discharge end thereof;

b. a pivotable transfer conveyor including:

i. support structure pivotally connected to a base;

ii. endless transfer conveyor means mounted on said support structure for pivotal movement therewith from a first position at the discharge end of said stack conveyor, where said endless conveyor means receives the vertical stack of articles, to a second position where the weight of the articles is supported on the endless conveyor for movement of the articles therewith to the discharge end of the endless transfer conveyor;

iii. legs connected to said support structure for pivotal movement therewith and extending substantially perpendicular to the endless conveyor means from one end thereof, said legs being located beneath the bottom surface of the lowermost article in the stack when said transfer conveyor is in said first position; and iv. means for driving said endless conveyor means to discharge articles therefrom at a predetermined speed;

c. means for pivoting said transfer conveyor between said first and second positions thereof;

d. an endless shingling conveyor supported from a frame at a location where an infeed end thereof is adjacent the discharge end of the transfer conveyor when the transfer conveyor is in said second position for receiving articles sequentially discharged from the transfer conveyor, and said shingling conveyor having a discharge end from where articles are deposited sequentially on the receiver, and means for driving the shingling conveyor in a direction from said infeed end toward said discharge end thereof; and e. a detector mounted adjacent the receiver for detecting when the articles have reached a predetermined level in the receiver, said drive means for said endless transfer conveyor and said drive means for said shingling conveyor being responsive to said detection means to deenergize both of the latter drive means when the articles reach a predetermined level in the receiver.

18. A method of transporting stacked, flat articles, such as box blanks which are initially stacked on top of each other, to a receiver which receives the articles in sequence, said method including the steps of:

a. advancing a stack of articles from an infeed to a discharge end of an article stack conveyor;

b. initially positioning an endless transfer conveyor with a movable article-supporting surface thereon substantially in a vertical plane and located at a position adjacent the discharge end of the article stack conveyor for receiving the stack of articles;

c. pivoting said endless transfer conveyor and said stack of articles to a second position where the side edges of the articles rest on the article-supporting surface of the endless transfer conveyor;

d. moving the endless transfer conveyor at a predetermined speed to discharge articles sequentially from a discharge end thereof;

e. detecting when the last article is near the discharge end of the transfer conveyor and then accelerating the speed of movement of the last article from the transfer conveyor at a speed greater than said predetermined speed of the transfer conveyor; and f. receiving the articles sequentially from the discharge end of the transfer conveyor onto a shingling conveyor and moving the articles from a discharge end of the shingling conveyor onto the receiver.

19. A method of transporting stacked, flat articles, such as box blanks which are initially stacked on top of each other, to a receiver which receives the articles in sequence, said method including the steps of:

a. advancing a stack of articles from an infeed to a discharge end of an article stack conveyor;

b. initially positioning an endless transfer conveyor with a movable article-supporting surface thereon substantially in a vertical plane and located at a position adjacent the discharge end of the article stack conveyor for receiving the stack of articles;

c. pivoting said endless transfer conveyor and said stack of articles to a second position where the side edges of the articles rest on the article-supporting surface of the endless transfer conveyor;

d. moving the endless transfer conveyor at a predetermined speed to discharge articles sequentially from a discharge end thereof;

e. receiving the articles sequentially from the discharge end of the transfer conveyor onto a shingling conveyor and moving the articles from a discharge end of the shingling conveyor onto the receiver; and f. advancing a second stack of articles to a holding position at the infeed end of the article stack conveyor while the endless transfer conveyor is moving an initial stack of articles onto the shingling conveyor.

20. A method of transporting stacked, flat articles, such as box blanks which are initially stacked on top of each other, to a receiver which receives the articles in sequence, said method including the steps of:

a. advancing a stack of articles from an infeed to a discharge end of an article stack conveyor;

b. initially positioning an endless transfer conveyor with a movable article-supporting surface thereon substantially in a vertical plane and located at a position adjacent the discharge end of the article stack conveyor for receiving the stack of articles;

c. pivoting said endless transfer conveyor and said stack of articles to a second position where the side edges of the articles rest on the article-supporting surface of the endless transfer conveyor;

d. moving the endless transfer conveyor at a predetermined speed to discharge articles sequentially from a discharge end thereof;

e. receiving the articles sequentially from the discharge end of the transfer conveyor onto a shingling conveyor and moving the articles from a discharge end of the shingling conveyor onto the receiver; and f. deenergizing the transfer conveyor and the shingling conveyor when the height of articles in the receiver exceeds a predetermined level.

21. In an apparatus for transporting stacked flat articles, such as box blanks, to a receiver wherein said apparatus includes a transfer conveyor intermediate a stack infeed conveyor and the receiver, said transfer conveyor including:

a. support structure pivotally connected to a base about a pivotal axis therefor;

b. endless transfer conveyor means mounted on said support structure for pivotal movement therewith from a first position where said endless conveyor means is located to receive the vertical stack of articles to a second position where the weight of the articles is supported on the endless conveyor for movement of the articles thereon to the discharge end of the transfer conveyor;

c. legs connected to said support structure for pivotal movement therewith and extending substantially perpendicular to the endless conveyor means from one end thereof, said legs being in a position to receive the stack of articles above the legs when said transfer conveyor is in said first position;

d. means for driving said endless conveyor means to discharge articles therefrom at a predetermined speed;

e. means for pivoting the transfer conveyor about said pivotal axis between said first and second positions; and f. means for detecting when the last blank to be discharged from the transfer conveyor is near the discharge end thereof, and accelerating means responsive to said detection means for accelerating removal of the last blank from the discharge end of the transfer conveyor.

* * * * *